United States Patent [19]

Lawes et al.

[11] Patent Number: 4,749,491

[45] Date of Patent: Jun. 7, 1988

[54] MICROBIOLOGICAL DECOMPOSITION OF CHLORINATED ALIPHATIC HYDROCARBONS

[75] Inventors: Bernard C. Lawes, Wilmington, Del.; Carolann D. Litchfield, Landenberg, Pa.

[73] Assignee: E. I. Du Pont de Nemours and Company, Wilmington, Del.

[21] Appl. No.: 77,019

[22] Filed: Jul. 23, 1987

Related U.S. Application Data

[63] Continuation of Ser. No. 033,258, Apr. 2, 1987, abandoned.

[51] Int. Cl.$^4$ .................................................. C02F 3/02
[52] U.S. Cl. .................................... 210/610; 210/620; 210/747; 210/759; 210/908
[58] Field of Search ............... 210/610, 611, 620, 629, 210/631, 747, 752, 759, 908, 909

[56] References Cited

U.S. PATENT DOCUMENTS

| | | | |
|---|---|---|---|
| 3,846,290 | 9/1972 | Raymond | 210/11 |
| 4,401,569 | 8/1983 | Jhaveri et al. | 210/610 |
| 4,493,895 | 1/1985 | Colaruotolo et al. | 210/610 X |
| 4,526,692 | 7/1985 | Yohe et al. | 210/747 |
| 4,588,506 | 5/1986 | Raymond et al. | 210/747 X |
| 4,591,443 | 5/1986 | Brown et al. | 210/747 |
| 4,683,064 | 7/1987 | Hallberg et al. | 210/610 X |

OTHER PUBLICATIONS

Michael J. Nelson et al., "Aerobic Metabolism of Trichloroethylene by Bacterial Isolate", Applied Environ. Microbiol., 52, 2 (Aug. 1986) pp. 383–384.
Michael J. Nelson et al., "Biodegradation of Trichloroethylene and Involvement of an Aromatic Biodegradative Pathway", Applied Environ. Microbiol., 53, 5 (May 1987) pp. 949–954.
Michael J. K. Nelson et al., "Characterization of Trichloroethylene Biodegradation by Strain G4", Abstract of Paper at Annual Meeting of American Society for Microbiology, Atlanta, GA, Mar. 2–6, 1987.
Wilson et al., "A Fixed-Film Bioreactor to Treat Trichloroethylene-Laden Waters from Interdiction Wells", May 1986, National Well Water Association Symposium, Columbus, Ohio.
Wilson, "Aquified Microbiology and Aerobic Transformations of Chlorinated Solvents", Jun. 1986, Stanford University Seminar on Biological Approaches to Aquifer Restoration–Recent Advances and New Opportunities.
Parsons et al., "Biotransformation of Chlorinated Organic Solvents in Static Microcosms", Environ. Toxicol. Chem., 4, (1985) pp. 739–742.
Fogel et al., "Biodegradation of Chlorinated Ethenes by a Methane-Utilizing Mixed Culture", App. Environ. Microbiol., 51, 4, (Apr. 1986), pp. 720–724.
J. T. Wilson et al., "Influence of Microbial Adaptation on the Fate of Organic Pollutants in Ground Water", 4, (1985) pp. 721–727.
Vogel et al., "Biotransformation of Tetrachloroethylene to Trichloroethylene, Dichloroethylene, Vinyl Chloride, and Carbon Dioxide Under Methanogenic Conditions", App. Environ. Microbiol., 49, 5, (May 1985) pp. 1080–1083.
Bouwer et al., "Anaerobic Degradation of Halogenated 1- and 2-Carbon Organic Compounds", Envir. Sci. Technol., 15, 5, (May 1981) pp. 596–599.
Bouwer et al., "Removal of Trace Chlorinated Organic Compounds by Activated Carbon and Fixed-Film Bacteria", Environ. Sci. Technol., 16, 12, (1982) pp. 836–843.
Jhaveri et al., "Bioreclamation of Ground and Groundwater by In-Situ Biodegradation Case History, Nov. 1985, Sixth Natl. Conf. Management of Uncontrolled Hazardous Waste Sites.
Wood et al., "Anaerobic Transformation, Transport, and Removal of Volatile Chlorinated Organics in Ground Water", Ground Water Quality, Wiley & Sons, New York, NY, (1985) pp. 493–511.
Tabak et al., "Biodegradability Studies with Organic Priority Pollutant Compounds", Journal Water Pollution Control Fed., 53, 10, (Oct. 1981) pp. 1503–1518.
Pigatello, "Ethylene Dibromide Mineralization in Soils Under Aerobic Conditions", App. Environ, Microbiol., 51, 3, (Mar. 1986) pp. 588–592.
Heyse et al., "*In Situ* Aerobic Biodegradation of Aquifer Contaminants at Kelly Air Force Base", Environ. Prog., 5, 3, (1986) pp. 207–211.

*Primary Examiner*—Tom Wyse
*Attorney, Agent, or Firm*—Craig H. Evans

[57] ABSTRACT

An aerobic method for in situ treatment of water and soil which has been contaminated with chlorinated hydrocarbons. The aerobic method involves feeding an aqueous solution of an oxygen source and nutrients without the addition of a flammable carbon source such as propane or methane gas to a contaminated area to cause the indigenous microorganisms to grow consuming the contaminants.

22 Claims, No Drawings

MICROBIOLOGICAL DECOMPOSITION OF CHLORINATED ALIPHATIC HYDROCARBONS

This application is a continuation, of application Ser. No. 033,258 filed Apr. 2, 1987, now abandoned.

BACKGROUND OF THE INVENTION

1. Field of the Invention

The present invention relates to a method for in situ treatment of water and soil which has been contaminated with chlorinated hydrocarbons. Aerobic methods employing an oxygen source, nutrients and indigenous microorganisms without the addition of a flammable carbon source such as propane or methane gas are used.

2. Related Art and Summary of Invention

Contamination of soil, groundwater, and subterranean formations as a result of hydrocarbon spills has presented a serious environmental problem. Various methods have been employed to remedy the problem. These include air stripping; vacuum venting; pump-and-treat operations using carbon adsorption or steam stripping, for example; and excavation. None of these methods takes care of the soil and water at the same time. Recently, several in situ techniques have been employed for some types of hydrocarbon spills.

U.S. Pat. No. 3,846,290 to Raymond, which is incorporated herein by reference, teaches a process for eliminating hydrocarbon contaminants such as crude oil and gasoline from underground water sources by providing nutrients and oxygen for indigenous microorganisms. The nutrients and oxygen are introduced through wells within and adjacent to the contaminated area, and water is removed from the area by other wells until the hydrocarbons are reduced to an acceptable level.

U.S. Pat. No. 4,401,569 to Jhaveri et al., which is incorporated herein by reference, teaches a process for treatment, both in situ and outside the earth, of hydrocarbons and halogenated hydrocarbons, in particular methylene chloride, by removing the ground water from the contaminated area; treating it with microorganisms, nutrients, and gases such as oxygen, nitrogen, and carbon dioxide; and returning it to the ground optionally together with other nutrients and oxygen.

U.S. Pat. No. 4,588,506 to Raymond et al., which is incorporated herein by reference, teaches a process for treatment of contaminants which may include inorganic materials and organic materials such as petroleum products, phenols, halo-carbons, and alcohols. Hydrogen peroxide at relatively low concentrations is injected into the subterranean formation. The concentration is gradually increased so as to acclimate the biota within the formation so that they can tolerate higher concentrations of hydrogen peroxide to, in turn, increase the rate of oxidation of the contaminants. Periodically the concentration of hydrogen peroxide is increased to a toxic level to remove the biota and any biomass and increase the permeability of the formation at the site of hydrogen peroxide injection.

Certain contaminants have been reported as not being satisfactorily treated by the aerobie in situ techniques, however. For example, chlorinated aliphatics such as 1,1,1- and 1,1,2-trichloroethane, 1,1-and 1,2-dichloroethane, trichloroethylene, carbon tetrachloride, tetrachloroethylene, chloroform, 1,2-dichloroethylene, and cis- and trans-1,2-dichloroethylene have been reported as not being biodegradable under aerobic processes. Also, under anaerobic conditions chlorinated aliphatic compounds such as trichloroethylene and tetrachloroethylene will metabolize to vinyl chloride, which is undesirable due to the reported carcinogenic nature of vinyl chloride.

Bouwer, Rittmann and McCarty in Volume 15 (1981) of *Environmental Science Technology*, pages 596–599, describe both aerobic and anaerobic tests for biodegradation of chloroform, trichloroethylene, tetrachloroethylene, dibromomethylene, dibromochloromethane and bromodichloromethane. They conclude there are no aerobic conditions under which these compounds degrade. Under anaerobic conditions, they note increased rates over those observed with the sterile controls indicating a microbial role in the disappearance of these compounds under anaerobic conditions.

Wood, Lang and Payan, in the 1985, edition of *Ground Water Quality*, J. Wiley and Sons, Inc., teach that anaerobic degradation of trichloroethylene and tetrachloroethylene can lead to highly volatile intermediates such as vinyl chloride, 1,1-dichloroethene and cis- and trans-1,2-dichloroethene depending on the microbial profile, which will vary seasonally.

Particularly, since these halogenated aliphatic hydrocarbons have found wide use as industrial degreasers, dry cleaning agents and septic tank cleaners, the potential for spills is great and, indeed, has been realized. As such, much effort has gone into finding an effective cleanup procedure for these compounds.

Recently, scientists have taught that it was possible to biodegrade trichloroethylene if a highly flammable carbon source such as methane or propane were co-fed with the air and nutrients. For example, B. H. Wilson and M. V. White presented a paper at the May, 1986, National Well Water Association Symposium in Columbus, Ohio, in which they taught that trichloroethylene in contaminated water could be reduced by the introduction of propane or natural gas and air into a coarse sand column through which the water was flowing. But there was no loss of 1,1,1-trichloroethane under the same conditions.

J. T. Wilson presented another paper at the June, 1986, Standford University Seminar on Biological Approaches to Aquifer Restoration in which he compared aerobic and anaerobic degradation of chlorinated aliphatic hydrocarbons. Current efforts to add propane or natural gas were discussed.

An object of the current invention is to avoid the formation of the undesirable vinyl chloride by employing an aerobic process while at the same time avoiding the need for employing a highly flammable carbon source as a co-feed.

DETAILED DESCRIPTION OF THE INVENTION

In accord with this invention, it has been found that certain soil contaminants, in particular, chlorinated aliphatic hydrocarbons such as 1,1,1- and 1,1,2-trichloroethane, 1,1- and 1,2-dichloroethane, trichloroethylene, carbon tetrachloride, tetrachloroethylene, chloroform, 1,1-dichloroethylene, cis- and trans-1,2-dichloroethylene, and vinyl chloride which have been reported as not being biodegradable under aerobic processes, can be eliminated by treatment of the contaminated water and soil with hydrogen peroxide and nutrients and indigenous microorganisms. The process of this invention is particularly effective at contaminant concentrations of greater than 1 part per million.

Hydrogen peroxide and nutrients are fed to the microbial flora in the form of an aqueous solution. Typically, an in situ treatment process is designed to circulate groundwater employing an extraction/infiltration well system. The aqueous solution containing hydrogen peroxide and nutrients is fed to one or more infiltration wells or galleries, flows through the subsurface contaminated area and is pumped from the ground through one or more extraction wells. The aqueous solution, after any needed addition of hydrogen peroxide or nutrients, may be returned to the infiltration wells or galleries. Preferably the flow of groundwater and nutrients through the system is established so as to not produce excess groundwater for off-site disposal. Total flow of groundwater through the system is determined by the hydrogeology of the subsurface. Hydrogen peroxide and nutrients are added to the groundwater either continuously or batch-wise.

The groundwater can be analyzed periodically to monitor the system and to determine the effectiveness of the treatment. Often the monitoring is by way of monitoring wells drilled both inside and outside the treatment area. Effectiveness of the bioreclamation is assessed based on isolation of the treatment area and changes in the microbial population and the contaminant concentration.

The locations and numbers of the infiltration wells or galleries, extraction wells, and monitoring wells will depend upon the size of the area of contamination and the nature of the formation, particularly its porosity. The locations should be chosen so that the aqueous solution of hydrogen peroxide and nutrients preferably contacts all the contaminated areas. Typically, the infiltration wells are placed on or just outside the outer perimeter of the contaminated area and the extraction wells are placed within the contaminated area. Galleries are placed so as to provide a flow of the hydrogen peroxide and nutrients through the contaminated area.

Hydrogen peroxide, as an oxygen source, is added to the groundwater before it is fed to the infiltration wells or galleries at a concentration estimated to provide a concentration at the site of the microorganisms that is nontoxic to the microorganisms. The initial concentration at the site of the microorganisms can vary but is generally about 50 to 200 parts per million. The concentration can be increased if the indigenous microorganisms are first acclimated to higher, otherwise cytotoxic, levels of the hydrogen peroxide. Levels are dependent on the acclimation of the microorganism and can be as high as 2000 parts per million. Concentrations of hydrogen peroxide can be estimated by analyzing groundwater samples obtained from the monitoring wells for increases in dissolved oxygen and hydrogen peroxide concentration.

Nutrients are in the form of an aqueous solution of the appropriate nitrogen, phosphorous and, optionally, other inorganic salts or cosubstrates. While virtually any nitrogen and phosphorous compounds may be used, the preferred ones will be determined based on the nature of the contaminated area, the microbial flora and economics. Preferably, nitrogen is supplied as $NH_4Cl$, $NH_4NO_3$, $NaNO_3$ or $(NH_4)_2SO_4$. The most preferred nitrogen compound is $NH_4Cl$. Preferably, phosphorous is supplied as $NaH_2PO_4$, $KH_2PO_4$, $Na_2HPO_4$, $K_2HPO_4$, polymeric phosphates and the like. Liquid fertilizers such as 12-6-6 and 8-8-8 are useful nutrients for this process.

The ratio of nitrogen to phosphorous in the nutrient should approximate the ratio of the nitrogen to the phosphorous in the microorganism. Preferably the ratio of nitrogen to phosphorous should be from about 5:1 to about 20:1 based on the microorganisms normally expected to be found in the area of the contamination.

The concentration of nutrients added to the infiltration wells or galleries depends on the nature of the contamination site. Since the nutrients are not so reactive as the hydrogen peroxide, the concentration of the nutrients as added to the infiltration wells or galleries will approximate their concentration at the site of the microorganism once steady state is reached. Chemical precipitation and ion exchange effects will reduce the concentration of nutrients until the soil is initially saturated.

Sufficient quantity of nutrients should be added to the water before it is fed to the infiltration wells or galleries to assure adequate growth of the microorganisms. Since the minimum concentration will depend on the nature of the contamination site, that is, the contamination and the microorganism population, the minimum level will have to be determined experimentally. The nutrient concentration should be limited so as to avoid overgrowth of the microorganisms leading to plugging of the substrata. Preferred concentrations of the nutrients are typically from about 0.01 to 1.0 weight percent.

Preferably, the hydrogen peroxide should be added after the nutrients are added and adjusted to the desired concentration. Hydrogen peroxide and nutrients may be added continuously or periodically to control the concentrations within the desired range at the site of the microorganisms based on their concentration in the monitoring or extraction wells.

Since indigenous microorganisms are being used, the temperature and pH of the groundwater as found in the area of the contamination is satisfactory.

In order to further illustrate the invention, the following examples are given. They are not intended to limit the scope of the invention.

EXAMPLES

Sample Collection

Groundwater samples from an area known to be contaminated with trichloroethylene, tetrachloroethylene and 1,2-trans dichloroethylene were collected from static and recently pumped wells using sterile bottles. The samples were taken from three different wells drilled in the area (Well No. 1, Well No. 2, and Well No. 3). The water samples were transferred to sterile, all-glass 2-gallon containers. These were filled to the top with the water, sealed with Teflon ® tape, and returned to the laboratory where they were processed within 24 hours.

Sample Processing

Fifty to 100 milliliters (mL) of each sample was distributed into special rubber-capped serum vials to which the amendments shown in Tables 1-3 were added. In all samples to which amendments were made, the amendments included 0.3 grams of a mixture of $Na_2HPO_4$ and $NaH_2PO_4$ in a ratio of 69:31 $Na_2HPO_4$:$NaH_2PO_4$ as well as 0.1 milliliter of a trace metal growth mixture. The trace metal growth mixture was 4.36 grams (gm) $Na_2$ EDTA, 3.15 gm $FeCl_3.6H_2O$, 0.01 gm $CuSO_4.5H_2O$, 0.01 gm $CoSO_4.6H_2O$, 0.022 gm $ZnSO_4.7H_2O$, 0.18 gm $MnCl_2.4H_2O$, 0.006 gm $Na_2$-

MoO$_4$.2H$_2$O and 1.0 gm H$_3$BO$_3$ in one liter of water. Other amendments are as indicated in the Tables 1-3. Except as indicated in the Tables, the examples were run in the presence of air.

All tests were run in triplicate. To be considered as valid data, at least two of the three tests had to replicate each other.

Each bottle was supplemented with 100 parts per million (ppm) of an equal mixture of trichloroethylene, tetrachloroethylene, and 1,2-trans dichloroethylene. This mixture was initially added to a piece of cotton suspended above the liquid in the bottles. However, subsequently, a fresh mixture was added to each bottle weekly through a hypodermic needle onto the surface of the liquid test sample.

The rubber cap on the vials was sealed by tying a double to triple fold of Saran Wrap ® over the stopper assembly. This wrapper minimizes the loss of the chlorinated solvents through the stopper and into the surrounding air. All samples were incubated, without any agitation, at room temperature (24° C.) for up to 52 days. As shown in Tables 1-3, some bottles were incubated at room temperature in the presence of air, others in the presence of air plus 10 parts per million (ppm) hydrogen peroxide and still others in an anaerobic chamber.

Analysis of Microbial Growth

Growth of the microorganisms on the chlorinated solvents was evaluated by visual inspection. This visual inspection of the bottles involved a subjective evaluation of turbidity and an observation of surface film growth and wall growth on the sides of the bottles. It is known that as the number of microorganisms in the liquid approaches about 10$^7$ to 10$^8$ microorganisms per milliliter, one will begin to notice turbidity. This level is indicated in Tables 1-3 by the symbol "±". Turbidity at levels less than about 10$^7$ generally cannot be observed visually. The symbol "—" in the Tables 1-3 indicates no observable turbidity. The symbols "+", "++", "+++" and "++++" are subjective evaluations of increasing levels of turbidity, with "++++" representing a sample that could be described as very opaque.

Results of the Test

The results of the incubation of groundwater with and without additional amendments are shown in Tables 1-3. Examples 15, 16 and 17 in Table 1; 32, 33 and 34 in Table 2; and 49, 50 and 51 in Table 3 are controls in which no nutrients were added. In these nine cases (where nothing was added and incubation was aerobic, where only hydrogen peroxide was added, or where nothing was added and incubation was in the anaerobic chamber), there was no visual turbidity indicating no growth.

Approximately equivalent growth was obtained when nitrogen, phosphate and hydrogen peroxide amendments were added without the addition of a cosubstrate as when the amendments were added with the cosubstrate, acetate. The process thus yields desired results with and without the addition of nonflammable cosubstrates for the microorganisms to feed upon. Use of highly flammable cosubstrates can be avoided.

While growth was observed in those amended laboratory samples incubated aerobically without the addition of hydrogen peroxide, the addition of hydrogen peroxide is preferred when the process is run in situ since the addition of hydrogen peroxide increases the oxygen available to the indigenous microorganisms.

TABLE 1

SUMMARY OF WELL NO. 1 SCREENING TESTS

| Example | Amendments to 100 mL sample[a] | Turbidity[b] |
|---|---|---|
| 1 | 1.0 gm NH$_4$Cl | ±w |
| 2 | 0.2 gm NH$_4$Cl | ± |
| 3 | 1.0 gm NH$_4$Cl + 10 ppm H$_2$O$_2$ | — |
| 4 | 0.2 gm NH$_4$Cl + 10 ppm H$_2$O$_2$ | — |
| 5 | 1.0 gm NH$_4$Cl + 0.01 gm acetate | ± |
| 6 | 1.0 gm NH$_4$Cl + 0.01 gm acetate + 10 ppm H$_2$O$_2$ | +w |
| 7 | 1.0 gm NH$_4$Cl - Anaerobic | w |
| 8 | 1.0 gm NaNO$_3$ | +w |
| 9 | 0.2 gm NaNO$_3$ | +w |
| 10 | 1.0 gm NaNO$_3$ + 10 ppm H$_2$O$_2$ | ±w |
| 11 | 0.2 gm NaNO$_3$ + 10 ppm H$_2$O$_2$ | +w |
| 12 | 1.0 gm NaNO$_3$ + 0.01 gm acetate | +++w |
| 13 | 1.0 gm NaNO$_3$ + 0.01 gm acetate + 10 ppm H$_2$O$_2$ | ++w |
| 14 | 1.0 gm NaNO$_3$ - Anaerobic | + |
| 15 | Nothing | — |
| 16 | 10 ppm H$_2$O$_2$ | — |
| 17 | Nothing - Anaerobic | — |

[a]All amended samples contained 0.3 gm of a 69:31 mixture of Na$_2$HPO and NaH$_2$PO$_4$ plus 0.1 mL trace metal growth mixture. A slight precipitate developed in all amended samples. Initial pH of the sample from Well No. 1 was 5.7. The pH of the liquid phase in each example was adjusted to pH 7-8.
[b]w indicates wall growth; — indicates no observable turbidity or wall growth; ±, +, ++, +++ and ++++ indicate increasing turbidity.

TABLE 2

SUMMARY OF WELL NO. 2 SCREENING TESTS

| Example | Amendments to 100 mL sample[a] | Turbidity[b] |
|---|---|---|
| 18 | 1.0 gm NH$_4$Cl | — |
| 19 | 0.2 gm NH$_4$Cl | — |
| 20 | 1.0 gm NH$_4$Cl + 10 ppm H$_2$O$_2$ | +w |
| 21 | 0.2 gm NH$_4$Cl + 10 ppm H$_2$O$_2$ | — |
| 22 | 1.0 gm NC$_4$Cl + 0.01 gm acetate | +w |
| 23 | 1.0 gm NC$_4$Cl + 0.01 gm acetate + 10 ppm H$_2$O$_2$ | +w |
| 24 | 1.0 gm NH$_4$Cl - Anaerobic | + |
| 25 | 1.0 gm NaNO$_3$ | +w |
| 26 | 0.2 gm NaNO$_3$ | ± |
| 27 | 1.0 gm NaNO$_3$ + 10 ppm H$_2$O$_2$ | +w |
| 28 | 0.2 gm NaNO$_3$ + 10 ppm H$_2$O$_2$ | + |
| 29 | 1.0 gm NaNO$_3$ + 0.01 gm acetate | +w |
| 30 | 1.0 gm NaNO$_3$ + 0.01 gm acetate + 10 ppm H$_2$O$_2$ | +w |
| 31 | 1.0 gm NaNO$_3$ - Anaerobic | + |
| 32 | Nothing | — |
| 33 | 10 ppm H$_2$O$_2$ | — |
| 34 | Nothing - Anaerobic | — |

[a]All amended samples contained 0.3 gm of a 69:31 mixture of Na$_2$HPO and NaH$_2$PO$_4$ plus 0.1 mL trace metal growth mixture. A slight precipitate developed in all amended samples. Initial pH of the sample from Well No. 2 was 9.4. The pH of the liquid phase in each example was adjusted to pH 7-8.
[b]w indicates wall growth; — indicates no observable turbidity or wall growth; ±, +, ++, +++ and ++++ indicate increasing turbidity.

TABLE 3

SUMMARY OF WELL NO. 3 SCREENING TESTS

| Example | Amendments to 100 mL sample[a] | Turbidity[b] |
|---|---|---|
| 35 | 1.0 gm NH$_4$Cl | ++w |
| 36 | 0.2 gm NH$_4$Cl | +w |
| 37 | 1.0 gm NH$_4$Cl + 10 ppm H$_2$O$_2$ | +++w |
| 38 | 0.2 gm NH$_4$Cl + 10 ppm H$_2$O$_2$ | +w |
| 39 | 1.0 gm NH$_4$Cl + 0.01 gm acetate | ++w |
| 40 | 1.0 gm NH$_4$Cl + 0.01 gm acetate + 10 ppm H$_2$O$_2$ | +w |
| 41 | 1.0 gm NH$_4$Cl - Anaerobic | + |
| 42 | 1.0 gm NaNO$_3$ | ++w |
| 43 | 0.2 gm NaNO$_3$ | ++++ |
| 44 | 1.0 gm NaNO$_3$ + 10 ppm H$_2$O$_2$ | +w |
| 45 | 0.2 gm NaNO$_3$ + 10 ppm H$_2$O$_2$ | +++w |
| 46 | 1.0 gm NaNO$_3$ + 0.01 gm acetate | ++w |
| 47 | 1.0 gm NaNO$_3$ + 0.01 gm acetate + 10 ppm H$_2$O$_2$ | ++w |

TABLE 3-continued
SUMMARY OF WELL NO. 3 SCREENING TESTS

| Example | Amendments to 100 mL sample[a] | Turbidity[b] |
|---------|-------------------------------|--------------|
| 48 | 1.0 gm $NaNO_3$ - Anaerobic | +w |
| 49 | Nothing | — |
| 50 | 10 ppm $H_2O_2$ | — |
| 51 | Nothing - Anaerobic | — |

[a] All amended samples contained 0.3 gm of a 69:31 mixture of $Na_2HPO$ and $NaH_2PO_4$ plus 0.1 mL trace metal growth mixture. A slight precipitate developed in all amended samples. Initial pH of the sample from Well No. 2 was 9.4. The pH of the liquid phase in each example was adjusted to pH 7-8.
[b] w indicates wall growth; — indicates no observable turbidity or wall growth; ±, +, ++, +++ and ++++ indicate increasing turbidity.

We claim:

1. An aerobic method of treatment of soil and groundwater contaminated with chlorinated aliphatic hydrocarbons that does not employ a highly flammable carbon source as a co-feed to reduce the level of contamination comprising:
   a. Feeding an aqueous solution to one or more infiltration wells or galleries positioned so as to assure flow through the contaminated area, the aqueous solution containing an oxygen source and nitrogen- and phosphorous-containing compounds as nutrients, the concentrations of which are sufficient to cause the indigenous microorganisms to grow consuming the contaminants;
   b. allowing the aqueous solution to flow through the contaminated area; and
   c. pumping the aqueous solution from the ground through one or more extraction wells.

2. The method of claim 1 wherein the oxygen source is hydrogen peroxide.

3. The method of claim 2 wherein the ratio of nitrogen to phosphorous in the nitrogen- and phosphorous-containing compounds approximates the ratio of the nitrogen to the phosphorous in the microorganism.

4. The method of claim 3 wherein the ratio of nitrogen to phosphorous is from about 5 to 1 to about 20 to 1.

5. The method of claim 2 wherein the nutrients are added to the contaminated area prior to the hydrogen peroxide.

6. The method of claim 5 wherein the concentration of the hydrogen peroxide at the site of the microorganism is at a level nontoxic to the microorganism, such level being dependent on the degree of acclimation of the microorganisms to the hydrogen peroxide.

7. The method of claim 6 wherein the concentration of the hydrogen peroxide prior to acclimation of the microorganism is from about 5 to 200 parts per million and the concentration after acclimation is greater than the concentration prior to acclimation but less than about 2000 parts per million.

8. The method of claim 2 wherein the nitrogen-containing compounds are selected from the group consisting of $NH_4Cl$, $NH_4NO_3$, $NaNO_3$ and $(NH_4)_2SO_4$ and the phosphorous-containing compounds are selected from the group consisting of $NaH_2PO_4$, $KH_2PO_4$, $Na_2HPO_4$, $K_2HPO_4$ and polymeric phosphates.

9. The method of claim 8 wherein the nitrogen-containing compound is $NH_4Cl$.

10. The method of claim 2 wherein the concentration of the nutrients is limited to a level selected so as to avoid overgrowth of the microorganisms leading to plugging the substrata.

11. The method of claim 10 wherein the concentration of the nutrients is about 0.01 to 1.0 weight percent of the aqueous solution.

12. The method of claim 1 wherein the chlorinated aliphatic hydrocarbons are selected from one or more of the following: 1,1,1-trichloroethane, 1,1,2-trichloroethane, 1,1-dichloroethane, 1,2-dichloroethane, trichloroethylene, carbon tetrachloride, tetrachloroethylene, chloroform, 1,1-dichloroethylene, cis-1,2-dichloroethylene, trans-1,2-dichloroethylene, and vinyl chloride.

13. The method of claim 12 wherein the oxygen source is hydrogen peroxide.

14. The method of claim 13 wherein the ratio of nitrogen to phosphorous in the nitrogen- and phosphorous-containing compounds approximates the ratio of the nitrogen to the phosphorous in the microorganism.

15. The method of claim 14 wherein the ratio of nitrogen to phosphorous is from about 5 to 1 to about 20 to 1.

16. The method of claim 13 wherein the nutrients are added prior to the hydrogen peroxide.

17. The method of claim 16 wherein the concentration of the hydrogen peroxide at the site of the microorganisms is at a level nontoxic to the microorganisms, such level being dependent on the degree of acclimation of the microorganisms to hydrogen peroxide.

18. The method of claim 17 wherein the concentration of the hydrogen peroxide prior to acclimation of the microorganism is from about 5 to 200 parts per million and the concentration after acclimation is greater than the concentration prior to acclimation but less than about 2000 parts per million.

19. The method of claim 13 wherein the nitrogen-containing compounds are selected from the group consisting of $NH_4Cl$, $NH_4NO_3$, $NaNO_3$ and $(NH_4)_2SO_4$ and the phosphorous-containing compounds are selected from the group consisting of $NaH_2PO_4$, $KH_2PO_4$, $Na_2HPO_4$, $K_2HPO_4$ and polymeric phosphates.

20. The method of claim 19 wherein the nitrogen-containing compound is $NH_4Cl$.

21. The method of claim 13 wherein the concentration of the nutrients is limited to a level selected so as to avoid overgrowth of the microorganisms leading to plugging the substrata.

22. The method of claim 21 wherein the concentration of the nutrients is about 0.01 to 1.0 weight percent of the aqueous solution.

* * * * *